(12) United States Patent
Bastian et al.

(10) Patent No.: US 10,666,954 B2
(45) Date of Patent: May 26, 2020

(54) AUDIO AND VIDEO MULTIMEDIA MODIFICATION AND PRESENTATION

(71) Applicant: INTERNATIONAL BUSINESS MACHINES CORPORATION, Armonk, NY (US)

(72) Inventors: David Bastian, Dupage, IL (US); Aaron K. Baughman, Silver Spring, MD (US); Nicholas A. McCrory, Sacramento, CA (US); Todd R. Whitman, Bethany, CT (US)

(73) Assignee: International Business Machines Corporation, Armonk, NY (US)

(*) Notice: Subject to any disclaimer, the term of this patent is extended or adjusted under 35 U.S.C. 154(b) by 23 days.

(21) Appl. No.: 16/011,905

(22) Filed: Jun. 19, 2018

(65) Prior Publication Data

US 2019/0387235 A1    Dec. 19, 2019

(51) Int. Cl.
| | | |
|---|---|---|
| *G09G 5/39* | (2006.01) |
| *H04N 19/17* | (2014.01) |
| *H04N 19/149* | (2014.01) |
| *H04N 19/503* | (2014.01) |
| *H04N 21/4402* | (2011.01) |
| *H04N 21/439* | (2011.01) |
| *H04N 19/426* | (2014.01) |
| *G06T 1/20* | (2006.01) |
| *G06T 1/60* | (2006.01) |

(52) U.S. Cl.
CPC ............. *H04N 19/17* (2014.11); *G06T 1/20* (2013.01); *G06T 1/60* (2013.01); *H04N 19/149* (2014.11); *H04N 19/427* (2014.11); *H04N 19/503* (2014.11); *H04N 21/4394* (2013.01); *H04N 21/440227* (2013.01)

(58) Field of Classification Search
CPC . G06T 1/20; G06T 1/60; H04N 19/17; H04N 19/149; H04N 19/427; H04N 19/503; H04N 21/4394; H04N 21/440227
See application file for complete search history.

(56) References Cited

U.S. PATENT DOCUMENTS

| | | |
|---|---|---|
| 5,301,241 A | 4/1994 | Kirk |
| 6,154,754 A | 11/2000 | Hsu et al. |
| 6,324,217 B1 | 11/2001 | Gordon |
| 6,665,423 B1 | 12/2003 | Mehrotra et al. |

(Continued)

FOREIGN PATENT DOCUMENTS

| | | |
|---|---|---|
| CN | 103957389 A | 7/2014 |
| EP | 1367505 | 12/2003 |
| WO | 2013040336 W | 3/2013 |

*Primary Examiner* — Charles Tseng
(74) *Attorney, Agent, or Firm* — Schmeiser, Olsen & Watts; Mark C. Vallone

(57) ABSTRACT

A method and system for improving audio and video multimedia modification and presentation is provided. The method includes receiving an audio/video stream and analyzing objects of the audio/video stream for generating predictions with respect to the objects. Component analysis code is executed with respect to the audio/video stream and an object is removed from the audio/video stream resulting in a modified audio/video stream being generated thereby reducing hardware storage and transfer size requirements of the audio/video stream. The modified audio/video stream is presented to a user via a graphical user interface.

24 Claims, 9 Drawing Sheets

(56) References Cited

U.S. PATENT DOCUMENTS

| | | |
|---|---|---|
| 6,947,378 B2 | 9/2005 | Wu et al. |
| 8,359,194 B2 | 1/2013 | Briand et al. |
| 8,515,258 B2 | 8/2013 | Chaudhuri et al. |
| 8,605,185 B2 | 12/2013 | Border et al. |
| 9,349,193 B2 | 5/2016 | Chen et al. |
| 2008/0059665 A1* | 3/2008 | Cheng ............... H04N 19/503 710/53 |
| 2010/0260402 A1 | 10/2010 | Axelsson et al. |
| 2010/0266207 A1* | 10/2010 | Zhang .................. H04N 5/262 382/195 |
| 2012/0069131 A1* | 3/2012 | Abelow ............... G06Q 10/067 348/14.01 |
| 2012/0131219 A1 | 5/2012 | Brannon, Jr. |
| 2014/0002639 A1* | 1/2014 | Cheben ............... G08B 21/14 348/135 |
| 2015/0334398 A1* | 11/2015 | Socek ..................... G06T 7/11 375/240.26 |
| 2016/0227168 A1* | 8/2016 | Vendrow .............. H04N 7/152 |
| 2016/0239980 A1 | 8/2016 | Tian et al. |

\* cited by examiner

AUDIO AND VIDEO MULTIMEDIA MODIFICATION AND PRESENTATION

FIELD

The present invention relates generally to a method for modifying audio and video multimedia and in particular to a method and associated system for improving audio and video multimedia technology associated with hardware device removal of objects from an audio/video stream resulting in a reduction hardware storage and transfer size requirements of the audio/video stream.

BACKGROUND

Broadcast video streams typically viewed for multiple hours during a given day are associated with processes that are well known. Likewise, a growth of the mobile device market in combination with current access availability of the Internet with respect to mobile devices enables easy access to multimedia content at any time with respect to any location. Current predictions estimate that a level of multimedia content will grow to over millions of terabytes in the future. A large number of solutions currently exist with respect to reducing a size of multimedia to account for the large amount of data being transmitted. Processes associated with capture or frame rates determined based on an objects motion throughout a visual scene may result in a lower amount of bandwidth being utilized. Allocating network resources or compressing images during multimedia data transfers may enable faster transmission of video signals. Similarly, processes for detecting pixels in a moving image may enable a user to view certain objects.

However, the aforementioned solutions may require the use of inaccurate and complex systems for transmission of multimedia streams. Additionally, the aforementioned solutions may result in slower data transmission rates. As a result, the current solutions do not comprise an effective means for reducing transmission size requirements.

Accordingly, there exists a need in the art to enable an efficient means for transmitting multimedia content.

SUMMARY

A first aspect of the invention provides an audio and video multimedia portion removal based modification and presentation improvement method comprising: receiving, by a processor of a hardware device from a local or remote source, an audio/video stream; analyzing, by the processor executing $R^2$ statistical regression code, objects of the audio/video stream for generating predictions with respect to the objects of the audio/video stream such that primary and non-primary focus objects are identified and tagged to determine associated interactions by detecting movements of the primary focus objects with respect to the non-primary focus objects; executing, by the processor, component analysis code with respect to the audio/video stream resulting in a process for parsing each object with respect to individual frames of the audio/video stream in accordance with a specified time period such that changes to the non-primary focus objects are predicted based on changes to the primary focus objects; removing, by the processor in response to the executing, an object of the objects from the audio/video stream resulting in a modified audio/video stream being generated resulting in hardware storage and transfer size requirements of the audio/video stream being reduced; and presenting, by the processor via a graphical user interface (GUI), the modified audio/video stream.

Some embodiments of the invention further provide a process for: determining that an additional object is more centrally located within the GUI than an original object; retrieving additional views of the audio/video stream; adding an additional object to the modified audio/video stream; and presenting, via the GUI, the modified audio/video stream comprising the additional object. These embodiments advantageously provide an effective means for isolating the principle components of an audio and video feed for focusing a user's attention with respect to a visual core action (within a multimedia stream) based on interactions between audio/video objects within an image. Additionally, these embodiments of the present invention advantageously enable a semantic pruning process to be implemented based on audio/video object motion and may be configured to reduce a size of the multimedia stream by smoothing neighboring pixels such that a user focuses on a climactic action within each audio/video frame instead of the superfluous object surrounding core objects.

A second aspect of the invention provides a computer program product, comprising a computer readable hardware storage device storing a computer readable program code, the computer readable program code comprising an algorithm that when executed by a processor of hardware device implements an audio and video multimedia portion removal based modification and presentation improvement method, the method comprising: receiving, by the processor from a local or remote source, an audio/video stream; analyzing, by the processor executing $R^2$ statistical regression code, objects of the audio/video stream for generating predictions with respect to the objects of the audio/video stream such that primary and non-primary focus objects are identified and tagged to determine associated interactions by detecting movements of the primary focus objects with respect to the non-primary focus objects; executing, by the processor, component analysis code with respect to the audio/video stream resulting in a process for parsing each object with respect to individual frames of the audio/video stream in accordance with a specified time period such that changes to the non-primary focus objects are predicted based on changes to the primary focus objects; removing, by the processor in response to the executing, an object of the objects from the audio/video stream resulting in a modified audio/video stream being generated resulting in hardware storage and transfer size requirements of the audio/video stream being reduced; and presenting, by the processor via a graphical user interface (GUI), the modified audio/video stream.

Some embodiments of the invention further provide a process for: determining that an additional object is more centrally located within the GUI than an original object; retrieving additional views of the audio/video stream; adding an additional object to the modified audio/video stream; and presenting, via the GUI, the modified audio/video stream comprising the additional object. These embodiments advantageously provide an effective means for isolating the principle components of an audio and video feed for focusing a user's attention with respect to a visual core action (within a multimedia stream) based on interactions between audio/video objects within an image. Additionally, these embodiments of the present invention advantageously enable a semantic pruning process to be implemented based on audio/video object motion and may be configured to reduce a size of the multimedia stream by smoothing neighboring pixels such that a user focuses on a climactic action within each audio/video frame instead of the superfluous object surrounding core objects.

A third aspect of the invention provides a hardware device comprising a processor coupled to a computer-readable memory unit, the memory unit comprising instructions that when executed by the processor implements an audio and video multimedia portion removal based modification and presentation improvement method comprising: receiving, by the processor from a local or remote source, an audio/video stream; analyzing, by the processor executing $R^2$ statistical regression code, objects of the audio/video stream for generating predictions with respect to the objects of the audio/video stream such that primary and non-primary focus objects are identified and tagged to determine associated interactions by detecting movements of the primary focus objects with respect to the non-primary focus objects; executing, by the processor, component analysis code with respect to the audio/video stream resulting in a process for parsing each object with respect to individual frames of the audio/video stream in accordance with a specified time period such that changes to the non-primary focus objects are predicted based on changes to the primary focus objects; removing, by the processor in response to the executing, an object of the objects from the audio/video stream resulting in a modified audio/video stream being generated resulting in hardware storage and transfer size requirements of the audio/video stream being reduced; and presenting, by the processor via a graphical user interface (GUI), the modified audio/video stream.

Some embodiments of the invention further provide a process for: determining that an additional object is more centrally located within the GUI than an original object; retrieving additional views of the audio/video stream; adding an additional object to the modified audio/video stream; and presenting, via the GUI, the modified audio/video stream comprising the additional object. These embodiments advantageously provide an effective means for isolating the principle components of an audio and video feed for focusing a user's attention with respect to a visual core action (within a multimedia stream) based on interactions between audio/video objects within an image. Additionally, these embodiments advantageously enable a semantic pruning process to be implemented based on audio/video object motion and may be configured to reduce a size of the multimedia stream by smoothing neighboring pixels such that a user focuses on a climactic action within each audio/video frame instead of the superfluous object surrounding core objects.

A fourth aspect of the invention provides an audio and video multimedia modification and presentation improvement method comprising: receiving, by a processor of a hardware device from a local or remote source, an audio/video stream; analyzing, by the processor executing $R^2$ statistical regression code, audio or video objects of the audio/video stream for generating predictions with respect to the objects of the audio/video stream; executing, by the processor, component analysis code with respect to the audio/video stream; modifying, by the processor in response to the executing, an object of the objects with respect to at least one additional object of the objects resulting in a modified audio/video stream being generated resulting in hardware storage and transfer size requirements of the audio/video stream being reduced; and presenting, by the processor via a graphical user interface (GUI), the modified audio/video stream.

Some embodiments of the invention further provide a method such that modifying a video object may include reducing a size of the object, blurring a view of the object or enhancing a view of the object. A further aspect of the invention provides a method such that modifying an audio object may include increasing or reducing an audible level of the object. These embodiments advantageously provide an effective means for isolating the principle components of an audio and video feed for focusing a user's attention with respect to a visual core action (within a multimedia stream) based on interactions between audio/video objects within an image. Additionally, these embodiments of the present invention advantageously enable a semantic pruning process to be implemented based on audio/video object motion and may be configured to reduce a size of the multimedia stream by smoothing neighboring pixels such that a user focuses on a climactic action within each audio/video frame instead of the superfluous object surrounding core objects.

A fifth aspect of the invention provides a computer program product, comprising a computer readable hardware storage device storing a computer readable program code, the computer readable program code comprising an algorithm that when executed by a processor of hardware device implements an audio and video multimedia modification and presentation improvement method, the method comprising: receiving, by the processor from a local or remote source, an audio/video stream; analyzing, by the processor executing $R^2$ statistical regression code, audio or video objects of the audio/video stream for generating predictions with respect to the objects of the audio/video stream; executing, by the processor, component analysis code with respect to the audio/video stream; modifying, by the processor in response to the executing, an object of the objects with respect to at least one additional object of the objects resulting in a modified audio/video stream being generated resulting in hardware storage and transfer size requirements of the audio/video stream being reduced; and presenting, by the processor via a graphical user interface (GUI), the modified audio/video stream.

Some embodiments of the invention further provide a method such that modifying a video object may include reducing a size of the object, blurring a view of the object or enhancing a view of the object. A further aspect of the invention provides a method such that modifying an audio object may include increasing or reducing an audible level of the object. These embodiments advantageously provide an effective means for isolating the principle components of an audio and video feed for focusing a user's attention with respect to a visual core action (within a multimedia stream) based on interactions between audio/video objects within an image. Additionally, these embodiments of the present invention advantageously enable a semantic pruning process to be implemented based on audio/video object motion and may be configured to reduce a size of the multimedia stream by smoothing neighboring pixels such that a user focuses on a climactic action within each audio/video frame instead of the superfluous object surrounding core objects.

The present invention advantageously provides a simple method and associated system capable of accurately broadcasting video streams.

DETAILED DESCRIPTION

Figure 1:
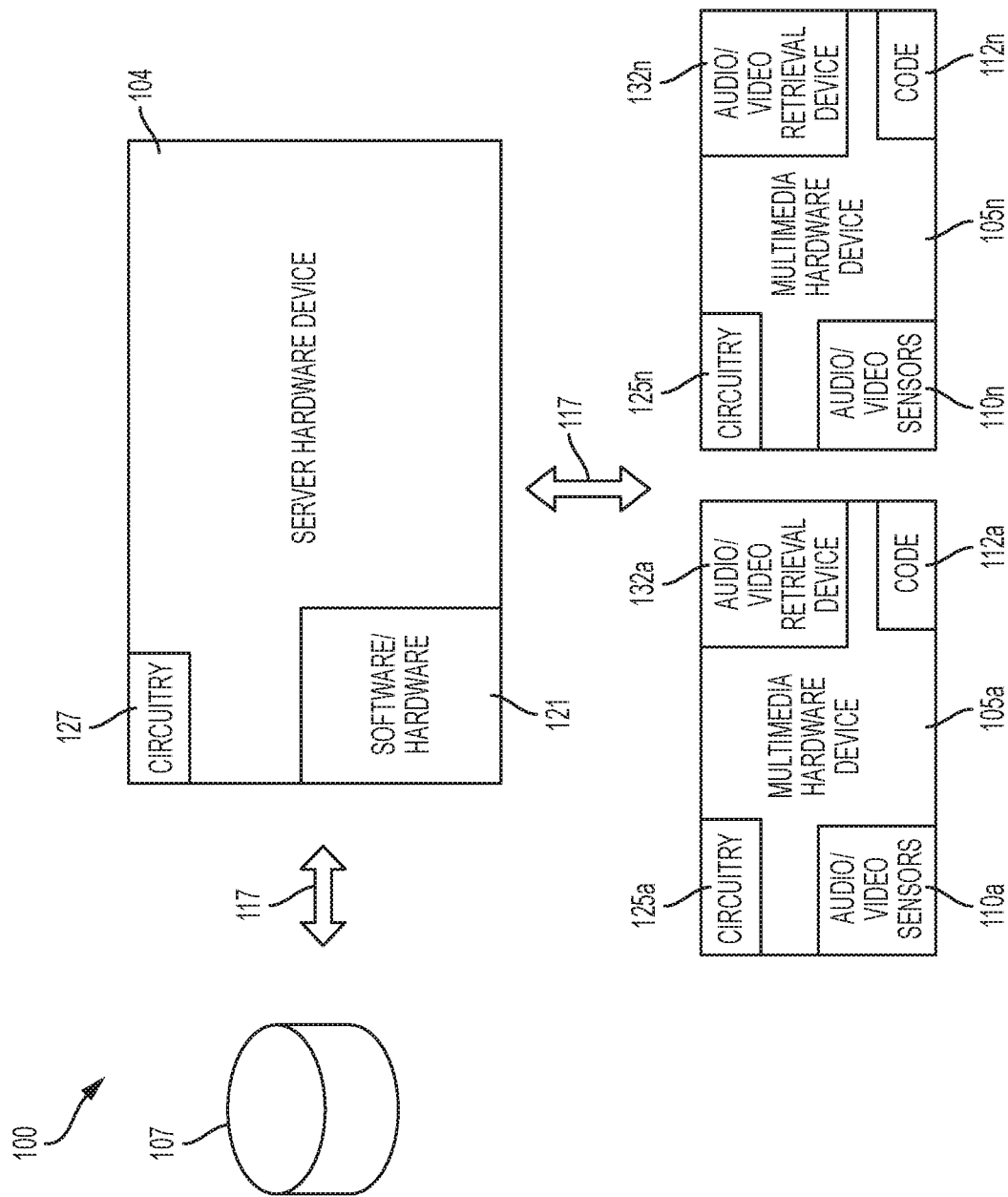
FIG. 1 illustrates a system for improving audio and video multimedia technology associated with hardware device removal of objects from an audio/video stream resulting in a reduction of hardware storage and transfer size requirements of the audio/video stream, in accordance with embodiments of the present invention.

FIG. 1 illustrates a system 100 for improving audio and video multimedia technology associated with hardware device removal of objects from an audio/video stream resulting in a reduction of hardware storage and transfer size requirements of the audio/video stream, in accordance with embodiments of the present invention. A current proliferation of multimedia content necessitates a more efficient focus with respect to reducing a size of the multimedia content. Additionally, a user's attention may require additional focus with respect to the multimedia content due to a wide variety of choices. Typical systems currently use scalable coding of multi-channel audio parameterized into a PCA transform. Further systems may decompose a sequence of images into a sparse foreground component. The decomposed images are compressed based on a detected motion in the sequence of images. In contrast, system 100 examines multimedia content via frame by frame interaction to represent object dependencies. Additionally, system 100 may enable a visual scene to be analyzed for locating dense visual areas within a video. System 100 provides an effective means for focusing a user's attention with respect to a visual core action (within a multimedia stream) based on interactions between audio/video objects within an image. Additionally, system 100 enables a semantic pruning process to be implemented based on audio/video object motion and may be configured to reduce a size of the multimedia stream by smoothing neighboring pixels such that a user focuses on a climactic action within each audio/video frame instead of the superfluous object surrounding core objects.

System 100 enables a process for modifying objects depicted in a video presentation as follows:

A frame of a (streaming) multimedia presentation is parsed for retrieval of a set of objects within each video frame of the multimedia presentation. In response, digital semantic tags are applied to individually to each of the objects within each video frame. The semantic tags describe relative motion characteristics of the objects. The tags may be modified with weighted values that increase for objects located centrally within a video frame and with respect to an increasing degree of relative movement. A set of principle objects (of the object) may be determined based on the weighted values associated with the objects. In response, an appearance of the set of principle objects are modified relative to additional objects within the set of objects. Modifying the appearance of the objects may include removing the additional objects from an associated video frame. Additionally, a background image may be generated to replace any object removed form an associated video frame. Furthermore, changes to the additional objects may be predicted via execution of principal component analysis (PCA) code.

System 100 enables a search feature enabled via hardware/software for focusing a user's attention with respect to a core action within a video presentation based on interactions of different audio/video objects within a displayed image. The audio/video objects are semantically pruned based on principle object motion via a process for smoothing pixels adjacent to a principle object. Additionally, system 100 provides a means for focusing user attention towards an apex an action within each video frame.

System 100 of FIG. 1 includes a server hardware device 104 (i.e., specialized hardware device), multimedia hardware devices 105a . . . 105n (i.e., specialized hardware device such as, inter alia, mobile devices, PDAs, etc.), and a database 107 (e.g., a cloud based system) interconnected through a network 117. Server database system 104 includes specialized circuitry 127 (that may include specialized software) and software/hardware structure 121. Multimedia hardware devices 105a . . . 105n may include personal devices provided to each user. Multimedia hardware devices 105a . . . 105n may be Bluetooth or wireless enabled to provide connectivity to any type of system. Multimedia hardware devices 105a . . . 105n include specialized circuitry 125a . . . 125n (that may include specialized software), audio/video retrieval devices 132a . . . 132n, audio/video sensors 110a . . . 110n, and code 112a . . . 112n (including statistical regression code and component analysis code). Audio/video sensors 110a . . . 110n may include any type of internal or external sensor (or biometric sensor) including, inter alia, a heart rate monitor, a blood pressure monitor, a temperature sensor, a pulse rate monitor, an ultrasonic sensor, an optical sensor, a video retrieval device, an audio retrieval device, humidity sensors, etc. Server hardware device 104, multimedia hardware devices 105a . . . 105n, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, multimedia hardware devices 105 . . . 105n, and database 107 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-9. The specialized discrete non-generic analog, digital, and logic based circuitry may include proprietary specially designed components (e.g., a specialized integrated circuit, such as for example an Application Specific Integrated Circuit (ASIC)

designed for only implementing an automated process for improving audio and video multimedia technology associated with hardware device removal of objects from an audio/video stream resulting in a reduction of hardware storage and transfer size requirements of the audio/video stream. Audio/video retrieval devices 132a . . . 132n may comprise any type of audio/video device including, inter alia, a camera, a video camera, a still shot camera, a microphone, etc. Network 117 may include any type of network including, inter alia, a local area network, (LAN), a wide area network (WAN), the Internet, a wireless network, etc. Alternatively, network 117 may include an application programming interface (API).

System 100 comprises hardware/software modules for providing the following video object based functionality:
1. Parsing images of video objects within each video frame to generate a frame based interaction representation with respect to time to determine which video frames are interacting with each other.
2. Determining semantic tags for each video object to determine if the semantic tags may be used to describe a video object's motion relative to additional video objects.
3. Diffusing semantic motion weights associated with video objects centrally located with respect to a display of a GUI.
4. Determining principle images based on a combination of centrality and semantic motion weights.
5. Usage of principal component analysis (PCA) for predicting changes to non-primary video objects based on changes of a primary video object.
6. Pruning video objects and sounds and interpolating new background video objects from additional camera angles or neighboring pixels based on a video object from a multimedia video stream if the video object is added to the core action.

Figure 2:
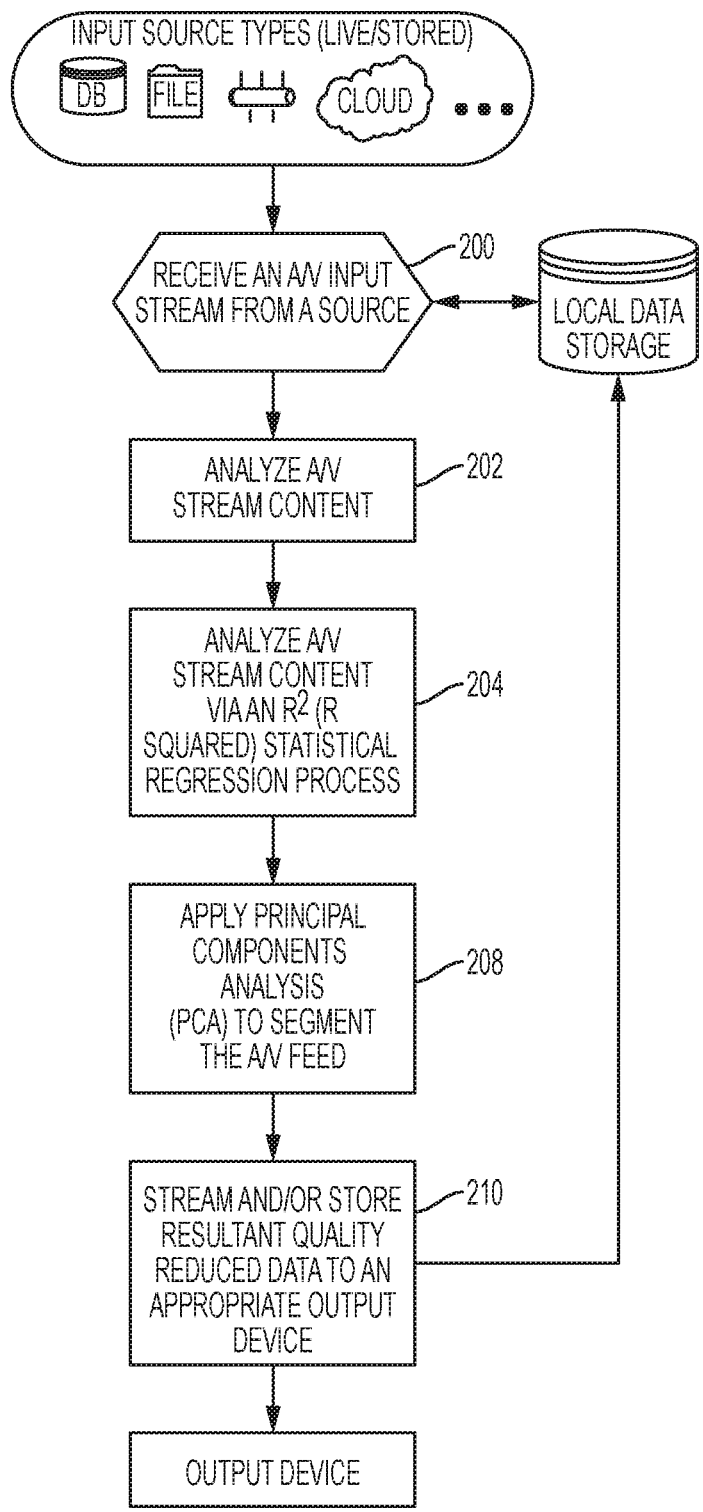
FIG. 2 illustrates an algorithm detailing a process flow enabled by the system of FIG. 1 for improving audio and video multimedia technology, in accordance with embodiments of the present invention.

FIG. 2 illustrates an algorithm detailing a process flow enabled by system 100 of FIG. 1 for improving audio and video multimedia technology, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and multimedia hardware devices 105a . . . 105n. In step 200, an audio video input stream is received from a plurality of sources including, inter alia, a database, a file system, a cloud based storage system, etc. In step 202, the audio video input stream is analyzed. The analysis may include identifying and tagging related primary audio/video object components. In step 204, the audio video input stream is further analyzed via an R squared statistical regression process. An R-squared statistical regression process is defined herein as a statistical measure of how close the (video) data are to a fitted regression line (e.g., a coefficient of determination). Therefore, an R-squared statistical regression process comprises a percentage of a response variable variation defined by a linear model such as: R-squared=Explained variation/Total variation. The R-squared statistical regression process is executed to predict movements of primary audio/video object component tracking with respect to surrounding non-primary audio/video object components and associated interactions between audio/video stream frames. In step 208, principal component analysis code is applied to segment the audio/video input stream resulting in the primary audio/video object component being presented as a sharp, clear, and/or audible structure. Likewise, all non-primary audio/video object components are presented as blurred, pruned, or inaudible structures. In step 210, a modified resulting (based on step 208) audio/video stream is presented (via an output device) and/or stored (in local data storage) and step 200 is repeated.

Figure 3:
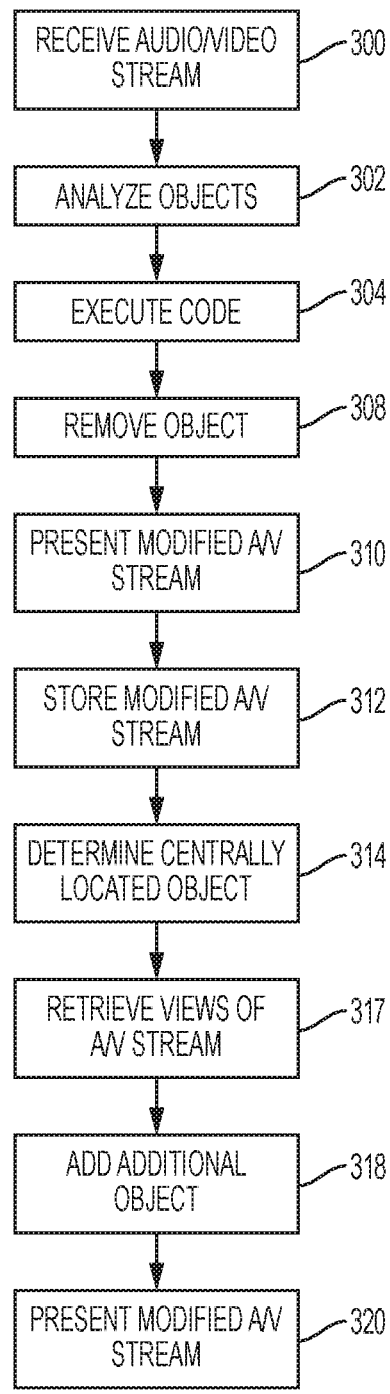
FIG. 3 illustrates an algorithm further detailing the process flow of FIG. 2 for improving audio and video multimedia technology, in accordance with embodiments of the present invention.

FIG. 3 illustrates an algorithm further detailing the process flow of FIG. 2 for improving audio and video multimedia technology, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by server hardware device 104 and multimedia hardware devices 105a . . . 105n. In step 300, an audio/video stream is received (by a multimedia device) from a local or remote source. In step 302, (audio and/or video) objects of the audio/video stream are analyzed via execution of R-squared ($R^2$ statistical regression code. The analysis results in the generation of predictions with respect to the objects of the audio/video stream. Analyzing the objects of the audio/video stream may include:
1. Identifying primary focus objects of the objects.
2. Identifying non-primary focus objects of the objects.
3. Tagging the primary focus objects and the non-primary focus objects.
4. Determining (based on results of the tagging) interactions between the primary focus and the non-primary focus objects with respect to individual frames of the audio/video stream. Determining the interactions may include detecting movements of the primary focus objects with respect to the non-primary focus objects within the individual frames.

In step 304, component analysis code is executed with respect to the audio/video stream. Execution of step 304 may result in a process for parsing each of the objects with respect to individual frames of the audio/video stream in accordance with a specified time period. Execution of step 304 may include:
1. Identifying primary focus objects.
2. Identifying non-primary focus objects.
3. Determining interactions between the primary focus and the non-primary focus objects.
4. Predicting changes to the non-primary focus objects based on changes to the primary focus objects.

In step 308, an object(s) is removed (based on results of step 304) from the audio/video stream resulting in a modified audio/video stream being generated. The modified audio/video stream results in hardware storage and transfer size requirements of the audio/video stream being reduced. Removing the object(s) may be performed based on the determined interactions of step 302. Removing the object(s) may results in directing a focus of a user towards the primary focus objects. In step 310, the modified audio/video stream is presented via a graphical user interface (GUI). In step 312, the modified audio/video stream is stored within a remotely located database. In step 314, it is determined that an additional object of the objects is more centrally located within the GUI than the original object. In step 317, additional views of the audio/video stream are retrieved from a local or remote source. In step 318, an additional object is added adding to the modified audio/video stream. In step 320, the modified audio/video stream comprising the additional object is presented via the GUI.

Figure 4:
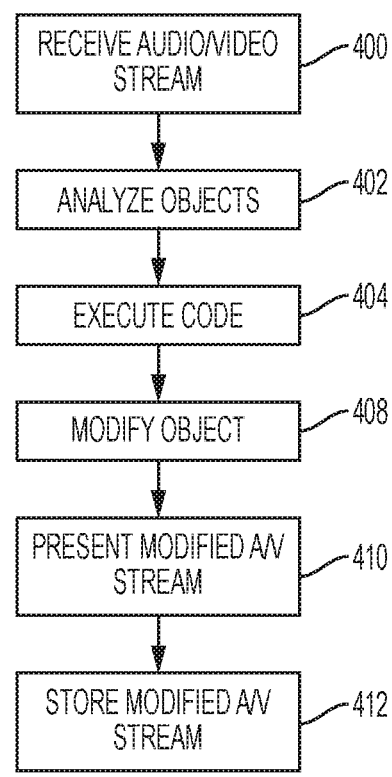
FIG. 4 illustrates an alternative algorithm with respect to the algorithm of FIG. 3, in accordance with embodiments of the present invention.

FIG. 4 illustrates an alternative algorithm with respect to the algorithm of FIG. 3, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by server hardware device 104 and multimedia hardware devices 105a . . . 105n. In step 400, an audio/video stream is received (by a multimedia device) from a local or remote source. In step 402, (audio and/or video) objects of the audio/video stream are analyzed via execution of R-squared ($R^2$ statistical regression code. The analysis results in the generation of predictions with respect to the objects of the audio/video stream. In step 404, component analysis code is executed with respect to the audio/video stream. Execution of step 404 may result in a process for parsing each of the objects with respect to individual frames of the audio/video stream in accordance with a specified time period. In step 408, an object is modified (in response to execution of step 404) with respect to at least one additional object resulting in a modified audio/video stream being generated. The modified audio/video stream results in hardware storage and transfer size requirements of the audio/video stream being reduced. Modifying a video object may include:

1. Reducing a size of the object with respect to the at least one additional video object.
2. Blurring a view of the object with respect to the at least one additional video object.
3. Enhancing a view of the object with respect to the at least one additional video object.

Modifying an audio object may include:
1. Reducing an audible level of the object with respect to the at least one additional audio object.
2. Increasing an audible level of the object with respect to the at least one additional audio object.

In step 410, the modified audio/video stream is presented via a graphical user interface (GUI). In step 412, the modified audio/video stream is stored within a remotely located database.

Figure 5:
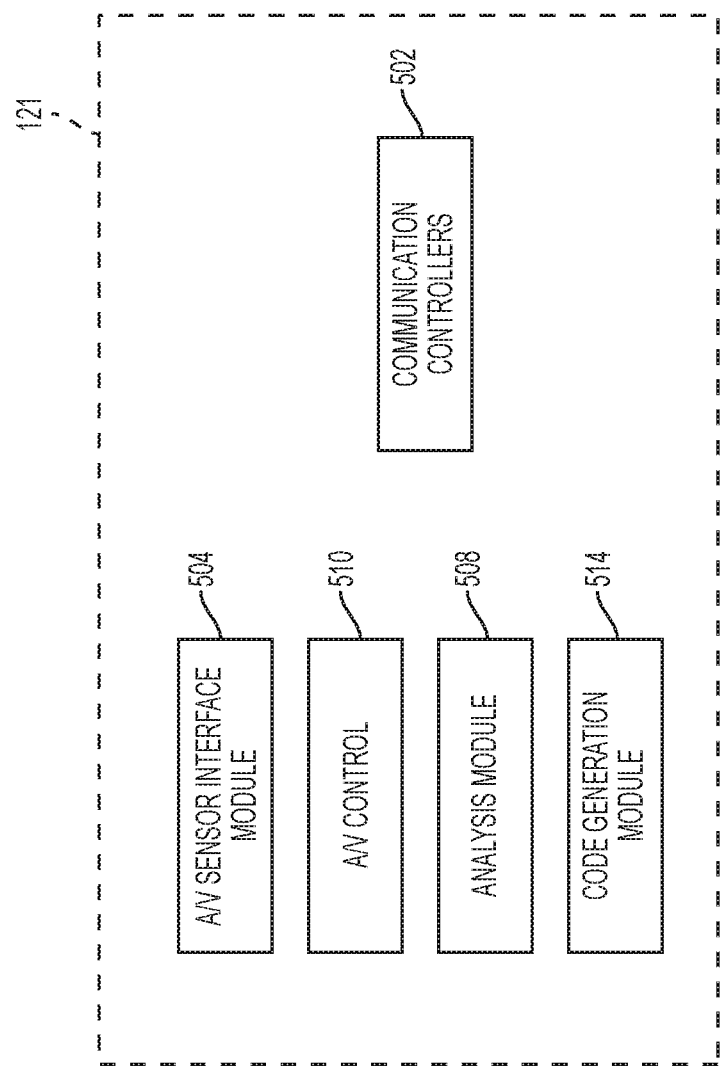
FIG. 5 illustrates an internal structural view of the software/hardware structure of FIG. 1, in accordance with embodiments of the present invention.

FIG. 5 illustrates an internal structural view of software/hardware structure 121 of FIG. 1, in accordance with embodiments of the present invention. Software/hardware structure 121 includes an audio/video (A/V) sensor interface module 504, an A/V control module 510, an analysis module 508, a code generation module 514, and communication controllers 502. A/V sensor interface module 504 comprises specialized hardware and software for controlling all functions related to audio/video sensors 110a . . . 110n of FIG. 1. A/V control module 510 comprises specialized hardware and software for controlling all functionality related to audio video retrieval devices 132a . . . 132n for retrieving audio/video streams and implementing the process described with respect to the algorithms of FIGS. 2-4. Analysis module 508 comprises specialized hardware and software for controlling all functions related to R-squared regression analysis and component analysis for removal or modification of audio/video objects of a multimedia stream. Code generation module 514 comprises specialized hardware and software for controlling all functions related to generating or modifying R-squared statistical regression code and/or component analysis code. Communication controllers 502 are enabled for controlling all communications between A/V sensor interface module 504, A/V control module 310, analysis module 508, and code generation module 514.

Figure 6:
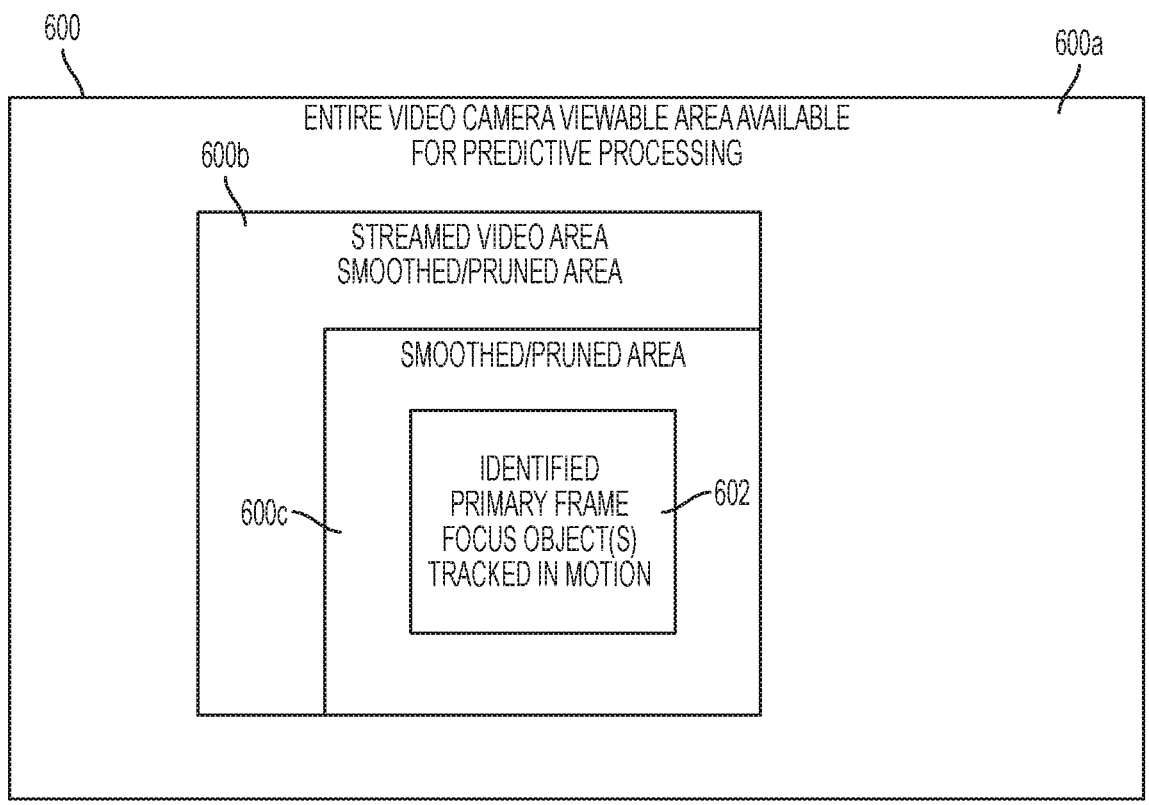
FIG. 6 illustrates a structural view of a GUI presenting a modified audio/video stream, in accordance with embodiments of the present invention.

FIG. 6 illustrates a structural view of a GUI 600 presenting a modified audio/video stream, in accordance with embodiments of the present invention. GUI 600 comprises a main viewing portion 600a, a first streamed audio/video portion 600b comprising first non-focus objects smoothed or pruned from the A/V stream, a second streamed audio/video portion 600b comprising second (and lesser) non-focus objects smoothed or pruned from the A/V stream, and a primary focus object(s) 602 that may include a single primary (audio and/or video) object or multiple related primary (audio and/or video) objects. GUI 600 is generated via a process for segmenting a live video camera feed and presenting a partial view of the entire viewable area being streamed while a remaining viewable area is analyzed for predictive subject and camera movement. The objects being streamed are tagged and monitored to determine a possible transition to primary importance objects. Detecting a primary object's movement allows other objects to be pruned (e.g., removed) from the A/V stream. Likewise, non-primary object movement is predicted based on movement of a primary object. For example, with respect to process for reviewing a surveillance video stream, essential components of the video stream may include images associated with movements of people in the video stream. Likewise, non-essential components of the video may include images associated with movements of animals in the video stream. Therefore, the images of movements of animals in the video stream may be pruned or blurred out of the surveillance video such that a user reviewing the surveillance video focuses his/her attention on the people in the video so that they are better able to determine if there are any issues that must be addressed. An additional example may include a scenario associated with limited bandwidth accessible by a mobile device. Therefore, any non-essential audio, video, or data objects may be removed from a data stream so that the data stream may consume less bandwidth while retaining essential portions of content of the data stream.

GUI 600 enables a process for dithering/smoothing/pruning identified non-essential and non-primary viewable objects within a streamed live frame (of a data stream) with a predicted primary subject or multiple primary subjects or camera implementing an associated action. Therefore, live video stream transmission data volume reduction is achieved while preserving single or multiple subject highlighting. Likewise, storage volume reduction is achieved from a live video feed capture and a resultant video requires less overall storage space and reduces a need for post processing.

Figure 7:
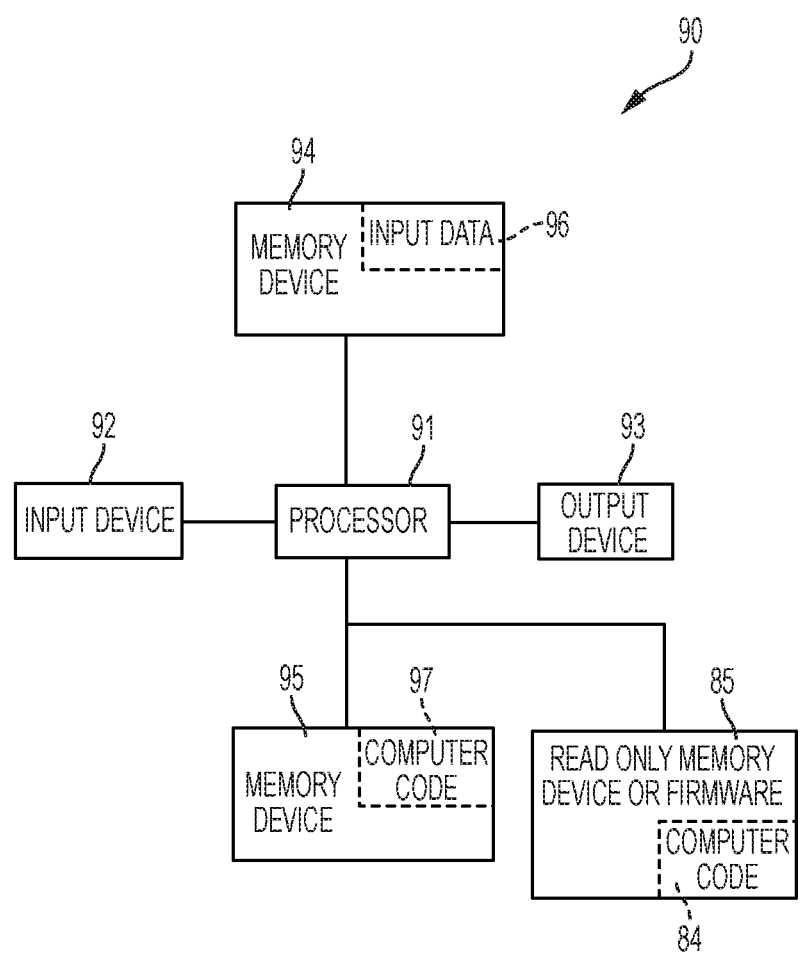
FIG. 7 illustrates a computer system used by the system of FIG. 1 for improving audio and video multimedia technology associated with hardware device removal of objects from an audio/video stream resulting in a reduction of hardware storage and transfer size requirements of the audio/video stream, in accordance with embodiments of the present invention.

FIG. 7 illustrates a computer system 90 (e.g., multimedia hardware 105a . . . 105n and/or server hardware device 104 of FIG. 1) used by or comprised by the system of FIG. 1 for improving audio and video multimedia technology associated with hardware device removal of objects from an audio/video stream resulting in a reduction of hardware storage and transfer size requirements of the audio/video stream, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2-4) for improving audio and video multimedia technology associated with hardware device removal of objects from an audio/video stream resulting in a reduction of hardware storage and transfer size requirements of the audio/video stream. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIGS. 2-4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve audio and video multimedia technology associated with hardware device removal of objects from an audio/video stream resulting in a reduction of hardware storage and transfer size requirements of the audio/video stream. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving audio and video multimedia technology associated with hardware device removal of objects from an audio/video stream resulting in a reduction of hardware storage and transfer size requirements of the audio/video stream. In another embodiment, the invention provides a business method that performs the process steps of the invention on a subscription, advertising, and/or fee basis. That is, a service supplier, such as a Solution Integrator, could offer to enable a process for improving audio and video multimedia technology associated with hardware device removal of objects from an audio/video stream resulting in a reduction of hardware storage and transfer size requirements of the audio/video stream. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
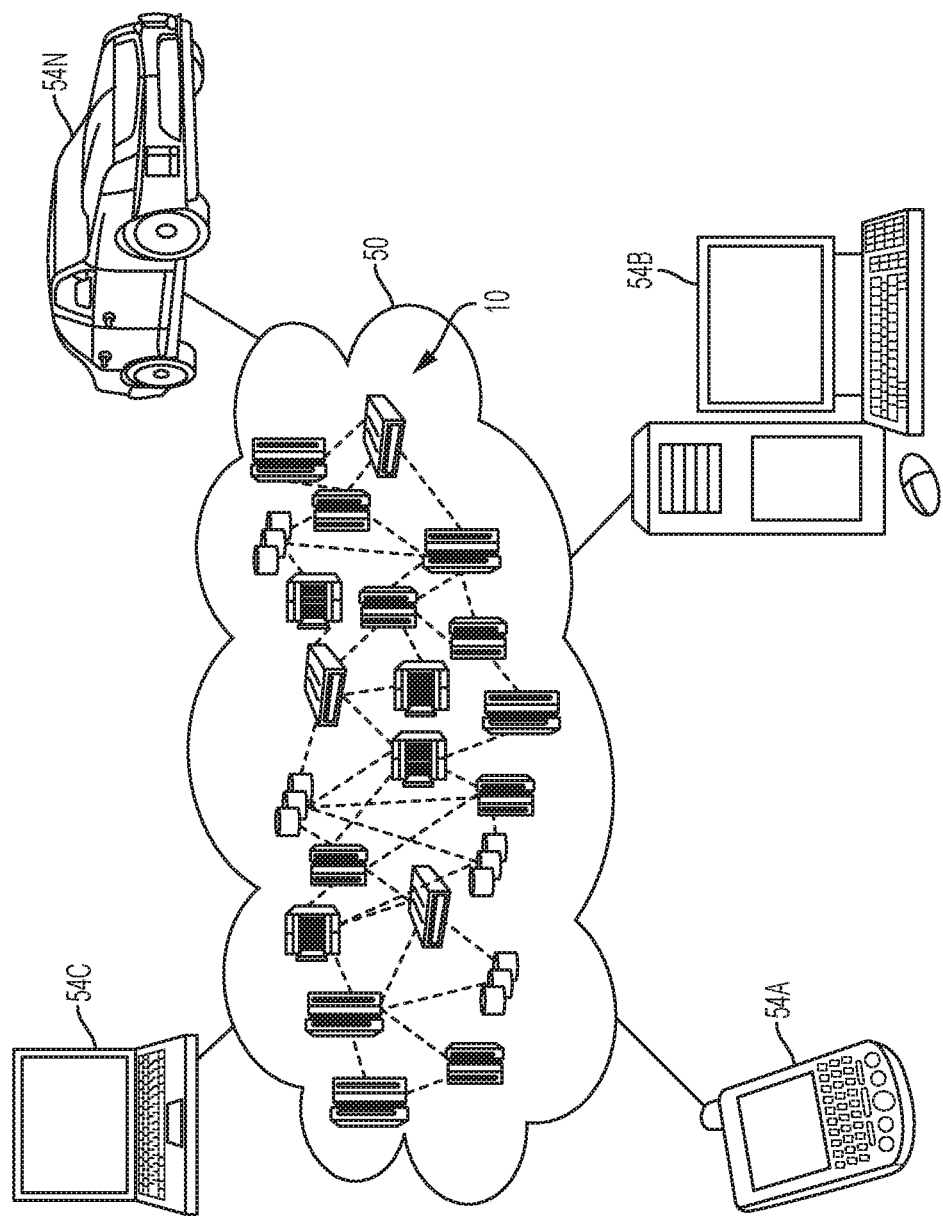
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 9:
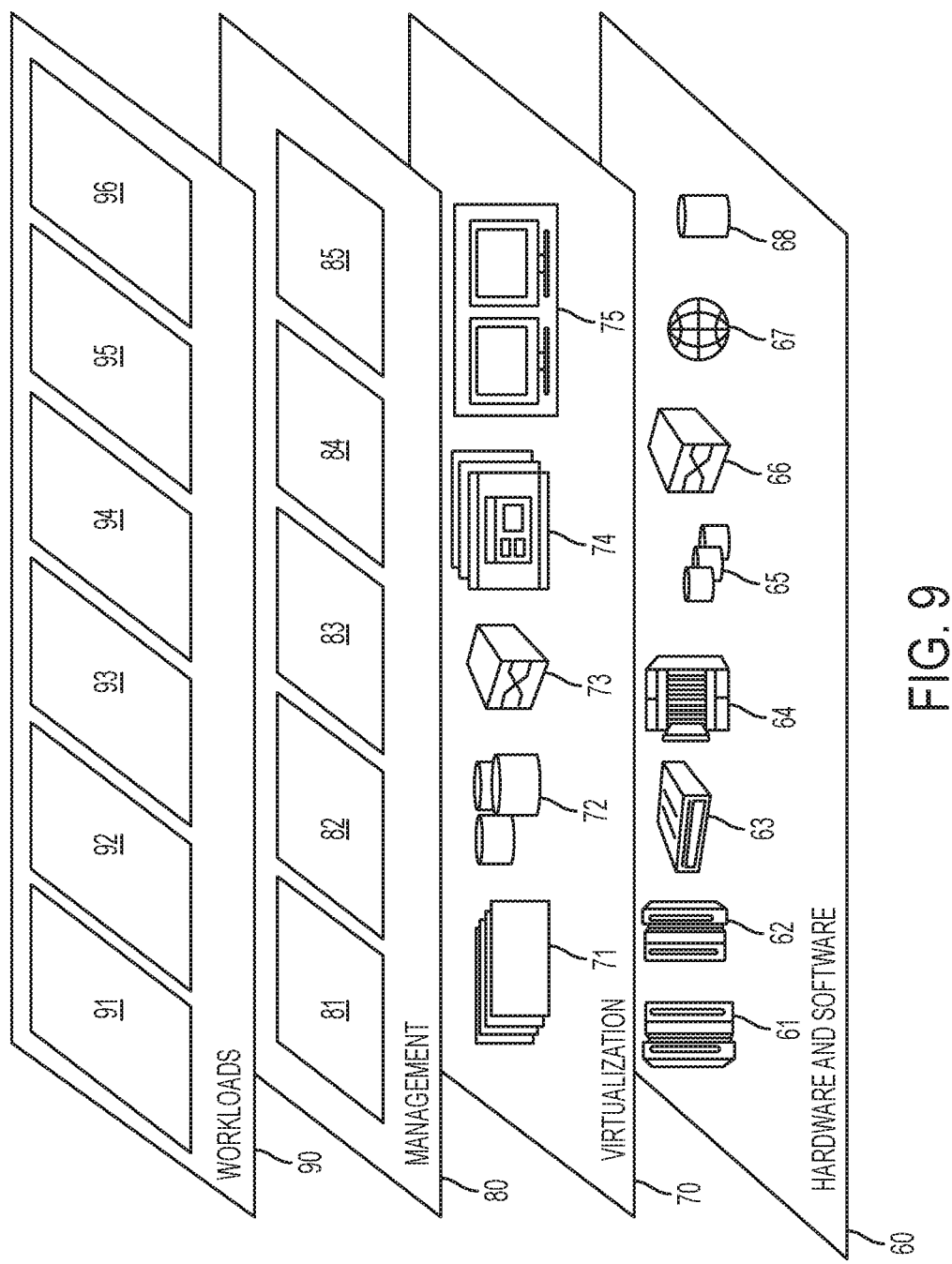
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving display generation and presentation technology associated with analyzing multiple video streams for presenting specified viewable data, retrieving associated feedback, and removing objects from an audio/video stream resulting in a reduction of hardware storage and transfer size requirements of the audio/video stream 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An audio and video multimedia portion removal based modification and presentation improvement method comprising:

receiving, by a processor of a hardware device from a local or remote source, an audio/video stream;

analyzing, by said processor executing $R^2$ statistical regression code, a plurality of objects of said audio/video stream for generating predictions with respect to said plurality of objects of said audio/video stream, wherein $R^2$ is a coefficient of determination for a fitted regression line;

executing, by said processor, component analysis code with respect to said audio/video stream;

removing, by said processor in response to said executing, a first object of said plurality of objects from said audio/video stream resulting in hardware storage and transfer size requirements of said audio/video stream being reduced;

presenting, by said processor via a graphical user interface (GUI), said audio/video stream; and determining, by said processor in response to said executing, that an additional object of said plurality of objects is more centrally located within said GUI than said first object, wherein said removing is further based on results of said determining.

2. The method of claim 1, wherein said analyzing said plurality of objects of said audio/video stream comprises:

identifying primary focus objects of said plurality of objects;

identifying non-primary focus objects of said plurality of objects;

tagging said primary focus objects and said non-primary focus objects; and determining, based on results of said tagging, interactions between said primary focus and said non-primary focus objects with respect to individual frames of said audio/video stream, wherein said removing is performed based on said interactions, and wherein said removing results in directing a focus of a user towards said primary focus objects.

3. The method of claim 2, wherein said determining said interactions comprises detecting movements of said primary focus objects with respect to said non-primary focus objects within said individual frames.

4. The method of claim 1, wherein said first object comprises a video object.

5. The method of claim 1, wherein said first object comprises an audio object.

6. The method of claim 1, wherein said first object comprises a video object and an associated audio object.

7. The method of claim 1, further comprising:

storing, by said processor within a remotely located database, said audio/video stream.

8. The method of claim 1, wherein said executing said component analysis code with respect to said audio/video stream results in parsing each of said plurality of objects with respect to individual frames of said audio/video stream in accordance with a specified time period.

9. The method of claim 1, wherein said executing said component analysis code with respect to said audio/video stream comprises:

identifying primary focus objects of said plurality of objects;

identifying non-primary focus objects of said plurality of objects;

determining interactions between said primary focus and said non-primary focus objects; and predicting changes to said non-primary focus objects based on changes to said primary focus objects.

10. The method of claim 1, further comprising:

retrieving, by said processor from said local or remote source, additional views of said audio/video stream;

adding, by said processor in response to said executing, a further additional object of said plurality of objects to said audio/video stream; and presenting, by said processor via said GUI, said audio/video stream comprising said further additional object.

11. The method of claim 1, further comprising:

providing at least one support service for at least one of creating, integrating, hosting, maintaining, and deploying computer-readable code in the hardware device, said computer-readable code being executed by said processor to implement: said receiving, said analyzing, said executing, said removing, and said presenting.

12. A computer program product, comprising a computer readable hardware storage device storing a computer readable program code, said computer readable program code comprising an algorithm that when executed by a processor of a hardware device implements an audio and video multimedia portion removal based modification and presentation improvement method, said method comprising:

receiving, by said processor from a local or remote source, an audio/video stream;

analyzing, by said processor executing $R^2$ statistical regression code, a plurality of objects of said audio/video stream for generating predictions with respect to said plurality of objects of said audio/video stream, wherein $R^2$ is a coefficient of determination for a fitted regression line;

executing, by said processor, component analysis code with respect to said audio/video stream;

removing, by said processor in response to said executing, a first object of said plurality of objects from said audio/video stream resulting in hardware storage and transfer size requirements of said audio/video stream being reduced;

presenting, by said processor via a graphical user interface (GUI), said audio/video stream; and determining, by said processor in response to said executing, that an additional object of said plurality of objects is more centrally located within said GUI than said first object, wherein said removing is further based on results of said determining.

13. A hardware device comprising a processor coupled to a computer-readable memory unit, said computer-readable memory unit comprising instructions that when executed by said processor implements an audio and video multimedia portion removal based modification and presentation improvement method comprising:

receiving, by said processor from a local or remote source, an audio/video stream;

analyzing, by said processor executing $R^2$ statistical regression code, a plurality of objects of said audio/video stream for generating predictions with respect to said plurality of objects of said audio/video stream, wherein $R^2$ is a coefficient of determination for a fitted regression line;

executing, by said processor, component analysis code with respect to said audio/video stream;

removing, by said processor in response to said executing, a first object of said plurality of objects from said audio/video stream resulting in hardware storage and transfer size requirements of said audio/video stream being reduced;

presenting, by said processor via a graphical user interface (GUI), said audio/video stream; and determining, by said processor in response to said executing, that an additional object of said plurality of objects is more centrally located within said GUI than said first object, wherein said removing is further based on results of said determining.

14. An audio and video multimedia modification and presentation improvement method comprising:

receiving, by a processor of a hardware device from a local or remote source, an audio/video stream;

analyzing, by said processor executing $R^2$ statistical regression code; a plurality of objects of said audio/video stream for generating predictions with respect to said plurality of objects of said audio/video stream, wherein $R^2$ is a coefficient of determination for a fitted regression line;

executing, by said processor, component analysis code with respect to said audio/video stream;

modifying, by said processor in response to said executing, a first object of said plurality of objects with respect to at least one additional object of said plurality of objects resulting in hardware storage and transfer size requirements of said audio/video stream being reduced;

presenting, by said processor via a graphical user interface (GUI), said audio/video stream; and determining, by said processor in response to said executing, that a further additional object of said plurality of objects is more centrally located within said GUI than said first object, wherein said modifying is further based on results of said determining.

15. The method of claim 14, wherein said first object comprises a video object, wherein said at least one additional object comprises at least one additional video object, and wherein said modifying said first object comprises reducing a size of said first object, projected via said GUI, with respect to said at least one additional video object.

16. The method of claim 14, wherein said first object comprises a video object, wherein said at least one additional object comprises at least one additional video object, and wherein said modifying said first object comprises blurring a view of said first object, projected via said GUI, with respect to said at least one additional video object.

17. The method of claim 14, wherein said first object comprises a video object, wherein said at least one additional object comprises at least one additional video object, and wherein said modifying said first object comprises enhancing a view of said first object, projected via said GUI, with respect to said at least one additional video object.

18. The method of claim 14, wherein said first object comprises an audio object, wherein said at least one additional object comprises at least one additional audio object, and wherein said modifying said first object comprises reducing an audible level of said first object, projected via said GUI, with respect to said at least one additional audio object.

19. The method of claim 14, wherein said first object comprises an audio object, wherein said at least one additional object comprises at least one additional audio object, and wherein said modifying said first object comprises increasing an audible level of said first object, projected via said GUI, with respect to said at least one additional audio object.

20. A computer program product, comprising a computer readable hardware storage device storing a computer readable program code, said computer readable program code comprising an algorithm that when executed by a processor of a hardware device implements an audio and video multimedia modification and presentation improvement method, said method comprising:

receiving, by said processor from a local or remote source, an audio/video stream;

analyzing, by said processor executing $R^2$ statistical regression code, a plurality of objects of said audio/video stream for generating predictions with respect to said plurality of objects of said audio/video stream, wherein $R^2$ is a coefficient of determination for a fitted regression line;

executing, by said processor, component analysis code with respect to said audio/video stream;

modifying, by said processor in response to said executing, a first object of said plurality of objects with respect to at least one additional object of said plurality of objects resulting in hardware storage and transfer size requirements of said audio/video stream being reduced;

presenting, by said processor via a graphical user interface (GUI), said audio/video stream; and determining, by said processor in response to said executing, that a further additional object of said plurality of objects is more centrally located within said GUI than said first object, wherein said modifying is further based on results of said determining.

21. The computer program product of claim 20, wherein said first object comprises a video object, wherein said at least one additional object comprises at least one additional video object, and wherein said modifying said first object comprises reducing a size of said first object, projected via said GUI, with respect to said at least one additional video object.

22. The computer program product of claim 20, wherein said first object comprises a video object, wherein said at least one additional object comprises at least one additional video object, and wherein said modifying said first object comprises blurring a view of said first object, projected via said GUI, with respect to said at least one additional video object.

23. The computer program product of claim 20, wherein said first object comprises a video object, wherein said at least one additional object comprises at least one additional video object, and wherein said modifying said first object comprises enhancing a view of said first object, projected via said GUI, with respect to said at least one additional video object.

24. The computer program product of claim 20, wherein said first object comprises an audio object, wherein said at least one additional object comprises at least one additional audio object, and wherein said modifying said first object comprises reducing an audible level of said first object, projected via said GUI, with respect to said at least one additional audio object.

* * * * *